3,288,798
CERTAIN BIS-o-ALKYLHYDROXYPHENYL-
THIAZOLES
John D. Spivack, Spring Valley, David H. Steinberg,
Bronx, and Martin Dexter, Briarcliff Manor, N.Y., assignors to Geigy Chemical Corporation, Greenburgh,
N.Y., a corporation of Delaware
No Drawing. Filed May 9, 1962, Ser. No. 193,603
4 Claims. (Cl. 260—302)

This invention relates to stabilization of unstable organic material, in particular to stabilization of polypropylene. The invention also concerns novel stabilizers, especially certain 2,2'-bis-(dialkyl-hydroxyphenylthiazole) stabilizers.

Bis-thiazole compounds are known. However, the bis-thiazole compounds of the invention are novel and suprisingly effective in stabilizing polypropylene against deterioration, e.g. due to heat, oxidation, etc.

The surprisingly effective stabilizers of the invention are those of the Formula I:

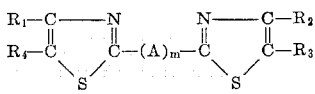

(I)

wherein $R_1$ and $R_2$ each independently represent an alkyl-substituted hydroxyphenyl radical containing at least one alkyl group in ortho position to the hydroxyl group on the phenyl nucleus, the hydroxyl group preferably being para to the carbon atom joining the phenyl nucleus and the thiazole nucleus, $R_3$ and $R_4$ independently may be hydrogen or lower alkyl, A is a lower alkylene group, branched or normal, and m is a number from 1 to 6 or 0.

In the preferred embodiment of the invention, polypropylene is effectively stabilized against deterioration due to heat and oxidation by a stabilizer of the formula:

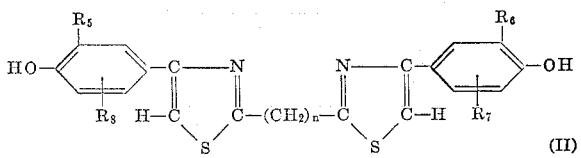

(II)

wherein $R_5$ and $R_6$ each independently represent a lower alkyl group especially tertiary butyl, $R_7$ and $R_8$ represent independently hydrogen or lower alkyl, tertiary butyl being especially preferred in the position ortho to the OH on the phenyl nucleus, and n represents 0 or 1.

Examples of alkyl groups useful in the Formulae I and II are: methyl, ethyl, n-propyl, n-amyl, isoamyl, hexyl, heptyl, octyl, nonyl, decyl, undecyl, dodecyl, tridecyl, tetradecyl, pentadecyl, hexadecyl, heptadecyl, octadecyl.

The term "lower alkyl" means an alkyl group having from 1 to 6 carbon atoms and includes normal and branched chain groups, as well as primary, secondary and tertiary groups.

Up to the present time, the use of the substituted bis-thiazoles of the invention in stabilizing polymeric material, e.g. polypropylene, has not been known. It has now surprisingly been found that polymeric material is stabilized, e.g. against thermal and oxidative deterioration, by incorporating therein effective quantities of one of the substituted thiazoles defined according to the present invention hereinabove.

Accordingly, it is an object of the invention to provide stable organic material, preferably stable polymeric material, e.g. polypropylene. In this specification it is understood that polymeric material means polyolefins, such as polyethylene, polypropylene, etc. Preferably, the polyolefins are of high molecular weight, e.g. above 1000 into the hundreds of thousands range. The polyethylenes may be of high density, medium density or low density class. The preferred polymeric material for stabilization is polypropylene.

Polymeric materials such as the foregoing, find use as thermoplastic molding or coating agents. Moreover, because of their high dielectric strength and their resistance to water, they are particularly useful as insulators or dielectrics in condensers and other such equipment. It is known that these polyolefins, e.g. polyethylene and polypropylene, are attacked by oxygen, particularly when exposed to the atmosphere and at elevated temperatures. For example, during use or manufacture the desirable properties of the polyolefins may be impaired due to oxidative deterioration. Such degradation causes loss in dielectric properties, discoloration, embrittlement, gelation, etc.

Not only homopolymeric materials, but also copolymers and physical mixtures thereof are stabilized according to the present invention. For example, high impact polystyrene containing copolymers of butadiene and styrene are stabilized according to the invention.

The invention is also useful in stabilizing lubricating oils of various types including aliphatic esters, such as for example dihexyl azelate, di-(2-ethylhexyl)-azelate, di - (3,5,5-trimethylhexyl)glutarate, di-(3,5,5-trimethylpentyl)glutarate, di-(2-ethylhexyl)pimelate, di-(2-ethylhexyl)adipate, diisoamyl adipate, triamyl tricarballylate, pentaerythritol tetracaproate, dipropylene glycol dipelargonate, 1,5-pentanediol-di-(2-ethylhexanoate), etc.

The stabilizers of the invention are also useful in stabilizing of fatty materials including oils of animal and vegetable origin which tend to deteriorate on standing and exposure to atmospheric oxygen. Among the edible fats and oils within the scope of the present invention are: linseed oil, menhaden oil, cod liver oil, castor oil, olive oil, rapeseed oil, coconut oil, palm oil, corn oil, sesame oil, peanut oil, cotton seed oil, butter, fat, lard, beef tallow, etc. Other oils and fats which deteriorate on standing and exposure to oxygen in the air or oxygen at elevated temperatures, are all within the scope of the present invention.

Within the scope of the invention, also, are saturated and unsaturated hydrocarbons which tend to deteriorate on storage, such as for example, gasolines, both natural and synthetic, in particular, saturated and unsaturated gasolines, etc., jet fuel, diesel oil, mineral oil, fuel oil, drying oil, waxes, resins, etc. Such hydrocarbons are protected against gum formation, discoloration and other deterioration with the stabilizers of the present invention.

It is, therefore, an object of the present invention to provide novel substituted bis-thiazole compounds which are versatile and effective stabilizers in at least a single class of the foregoing organic materials which are normally subject to deterioration caused by exposure to heat and/or oxygen, etc. Other objects of the invention will in part be obvious and in part be apparent from what follows.

A particularly preferred stabilizer of the invention is 2,2' - bis - [4 - (3",5" - di - tert - butyl - 4" - hydroxyphenyl)thiazole] which is especially useful in stabilizing polyolefinic material, e.g. polypropylene and polyethylene, as well as other polymeric material, e.g. polystyrene, in particular "high impact" polystyrene. This bis-thiazole is also an effective stabilizer for other unstable organic material, e.g. hydrocarbon oil of mineral origin, gasoline, both natural and synthetic, oils of animal origin, oils of vegetable origin, high temperature lubricating oils, e.g. esters of fatty acids, in particular, diesters of fatty acids having from 5 to 15 carbon atoms per molecule. Further organic materials which are stabilized by this bis-thiazole comprise aldehydes, such as heptaldehyde.

The compounds of this invention may be used also to stabilize organic material in combination with other additive agents, such as for example, antioxidants, pourpoint depressants, corrosion and rust inhibitors, dispersing agents, demulsifiers, antifoaming agents, carbon black, accelerators and other chemicals used in rubber compounding, plasticizers, color stabilizers, heat stabilizers, UV absorbers, dye and pigments, fillers, etc.

It is understood that the stabilizers of the invention are not necessarily of equivalent potency. The specific stabilizers most useful to a given unstable material will depend upon several factors for its advantages. Availability and cost of raw materials for the manufacture of the stabilizer and effective inhibitory action of the stabilizer, including duration and degree of activity, are among the factors which control the choice of a specific stabilizer for a specific substrate which is normally subject to deterioration. Toxicity, color, stability to light and/or heat and solubility are also important factors. For example, a preferred composition according to the invention comprises from about 0.001% to about 5% by weight of 2,2' - bis - [4 - (3'',5'' - di - tert - butyl - 4''-hydroxyphenyl)thiazole] and polypropylene.

In general, stabilizers of the invention are employed in a concentration of from about 0.001% to about 5% by weight preferably from about 0.01% to about 1% by weight. The specific concentration used varies with the substrate and the stabilizer, but the following ranges are preferred.

Concentrations of about 0.001% to about 0.1% by weight for the stabilizer in polyethylene are useful. In polypropylene from about 0.05% to about 1% by weight of stabilizer is especially useful. For polystyrene, from about 0.1% to about 1% by weight is useful. In mineral oils, concentrations of from about 0.005% to about 1% by weight of stabilizer are used. Gasolines are stabilized with from about 0.01% to about 0.1% by weight of stabilizer, preferably about 0.05% by weight. Fatty material of animal origin, such as lard, is stabilized with from about 0.001% to about 0.1% by weight of stabilizer. Oils of vegetable origin, such as cotton seed oil, are similarly stabilized with from about 0.001% to about 0.1% by weight of thiazole stabilizer.

Hydrocarbon material, such as cycloolefins, e.g. cyclohexene, is advantageously stabilized with from about 0.001% to about 1% by weight of the stabilizers of the present invention. Similar concentrations of stabilizer are used to stabilize aldehydes, such as for example, about 0.01% by weight in heptaldehyde. High temperature lubricants which are essentially diesters, e.g., diisoamyladipate, are stabilized with from about 0.5% to about 5%, preferably about 2% by weight of a stabilizer according to the invention.

The stabilizer compounds of the present invention are prepared by reaction of an appropriately substituted haloacetylalkylphenol with dithioxamide to yield the desired bis-thiazole compound. Alternatively, an appropriate dithiocarboxylic acid amide is reacted with an α-bromo-4-acetylalkylphenol to yield the desired alkylene bis-thiazole compound. Details of the preparations will be apparent from the examples which follow.

The stabilized compositions of the invention are prepared by incorporation of the stabilizer into the material to be stabilized. If the material subject to deterioration is a solid resin such as polypropylene, the material may be incorporated by milling the same into the resin as will be seen from the example which follows. Other methods of incorporating the stabilizer into the resin include extrusion, molding, etc.

In the following examples, parts are by weight unless otherwise indicated and the relationship between parts by weight and parts by volume is as that of grams to cubic centimeters. The temperature is in degrees centigrade.

EXAMPLE I

*Preparation of 2,2'-bis-[4-(3'',5''-di-tert-butyl-4''-hydroxyphenyl)thiazole]*

9.9 parts of 4-ω-bromoacetyl-2,6-di-t-butylphenol is dissolved in 25 parts of benzene and added dropwise over 20 minutes to a dispersion of 1.8 parts of dithioxamide in 100 parts by volume of ethanol. The reaction mixture is heated at reflux (74–75°) for three hours. Thereafter, the product crystallizes on cooling and has a melting point of 265°. The so-obtained 2,2'-bis-[4-(3'',5''-di-tert-butyl-4''-hydroxyphenyl)thiazole] is recrystallized from cyclohexane melting at 267–268°.

*Analysis.*—Calc'd. for $C_{34}H_{44}N_2O_2S_2$: C, 70.83%; H, 7.64%; N, 4.86%. Found: C, 70.94%; H, 7.66%: N, 4.94%.

If in the foregoing example, 4-ω-bromoacetyl-2-methylphenol is substituted for the 2,6-di-t-butylphenol derivative, then 2,2'-bis-[4-(3''-methyl-4''-hydroxyphenyl)thiazole] is obtained. Likewise, if in the foregoing example, 4-ωbromoacetyl-2-dodecylphenol is substituted for the 2,6-di-t-butylphenol derivative used therein, then 2,2' - bis - [4 - (3'' - dodecyl - 4'' - hydroxpyhenyl)thiazole] is obtained.

EXAMPLE II

*Preparation of 2,2'-methylene-bis-α-[4-(3'',5''-di-tert-butyl-4''-hydroxyphenyl)thiazole]*

3.35 parts of dithiomalonamide is stirred with 100 parts by volume of methyl alcohol and the mixture heated to 70–75°. To this mixture is added a solution of 16.4 parts of α-bromo-4-acetyl-2,6-di-t-butylphenol in 30 parts by volume of benzene. The resultant mixture is heated an additional 2½ hours at 70–75°. After cooling and diluting with 100 parts by volume of water, the product is isolated by extracting with ether. The ether is removed by distillation at about 20 mm./Hg pressure. After recrystallization from cyclohexane the so-obtained 2,2'-methylene-bis - [4-(3'',5''-di-tert-butyl-4''-hydroxyphenyl)thiazole] melts at 182.5–183.5°. Yield: 1.9 parts (12% of theory).

*Analysis.*—Calc'd. for $C_{35}H_{46}N_2O_2S_2$: C, 71.14%; H, 7.85%; N, 4.74%. Found: C, 71.43%; H, 8.33%; N, 4.91%.

If in the foregoing example, α-bromo-4-acetyl-2,6-dimethylphenol is substituted for the 2,6-di-t-butylphenol derivative, then 2,2'-methylene-bis-[4-(3'',5''-dimethyl-4''-hydroxyphenyl)thiazole] is obtained. Likewise, if in the foregoing example, α-bromo-4-acetyl-2-t-octylphenol is substituted for the 2,6-di-t-butylphenol therein, then 2,2' - methylene - bis - [4 - (3'' - tert - octyl - 4'' - hydroxyphenyl)thiazole] is obtained.

EXAMPLE III

*Stabilized composition of polypropylene*

Unstabilized polypropylene powder (Hercules Profax 6501) is thoroughly blended with 0.5% by weight of 2,2' - bis - [4 - (3'',5'' - di - tert - butyl - 4'' - hydroxyphenyl)thiazole] prepared according to Example I. The blended material is then milled on a two roll mill at 182° for ten minutes after which time the stabilized polypropylene is sheeted from the mill and allow to cool.

The milled polypropylene sheet is then cut into small pieces and pressed for seven minutes on a hydraulic press at 218° and 2000 lbs./square inch pressure. The resultant sheet of 25 mil thickness is then tested for resistance to accelerated aging in a forced draft oven at 149°. The so-prepared polypropylene sheet is stabilized against deterioration for more than 1300 hours while an unstabilized sheet—without the stabilizer in Example I—fails and deteriorates after less than 3 hours in the oven under the same conditions.

A stabilized sheet of polypropylene is prepared in the same fashion as described above in Example III, having therein 0.5% by weight of 2,2'-methylene-bis-[4-(3",5"-di-tert-butyl-4"-hydroxyphenyl)thiazole] prepared according to Example II. The so prepared polypropylene sheet is stabilized against deterioration for more than 1000 hours, while an unstabilized sheet—without the stabilizer of Example II—fails and deteriorates after less than 3 hours in the oven under the same conditions.

What is claimed is:

1. A compound of the formula:

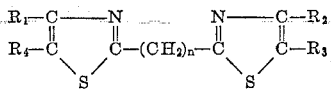

wherein $R_1$ and $R_2$ each independently represent an alkyl-substituted hydroxyphenyl radical containing at least one alkyl group in ortho position to the hydroxyl group on the phenyl nucleus wherein said alkyl group has from 1 to 18 carbon atoms, $R_3$ and $R_4$ are each independently selected from the group consisting of hydrogen and lower alkyl, and $n$ is 0 or 1.

2. A compound of the formula:

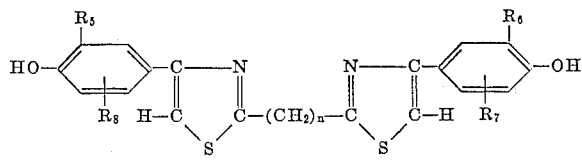

wherein $R_5$ and $R_6$ are each independently lower alkyl, $R_7$ and $R_8$ are each independently selected from the group consisting of hydrogen and lower alkyl, and $n$ is 0 or 1.

3. 2,2' - bis - [4 - (3",5" - di - tert - butyl - 4" - hydroxyphenyl)thiazole].

4. 2,2' - methylene - bis - [4 - (3",5" - di - tert - butyl-4"-hydroxyphenyl)thiazole].

References Cited by the Examiner
UNITED STATES PATENTS

| | | | |
|---|---|---|---|
| 2,905,666 | 9/1959 | Stevens | 260—240 |
| 3,010,912 | 11/1961 | Hardman | 252—405 |
| 3,065,240 | 11/1962 | Bodanszky et al. | 260—302 |
| 3,112,291 | 11/1963 | Anderson | 260—45.8 |

ALEX MAZEL, *Primary Examiner.*

LEON J. BERCOVITZ, *Examiner.*

H. E. TAYLOR, R. J. GALLAGHER,
*Assistant Examiners.*